United States Patent Office 3,360,328
Patented Dec. 26, 1967

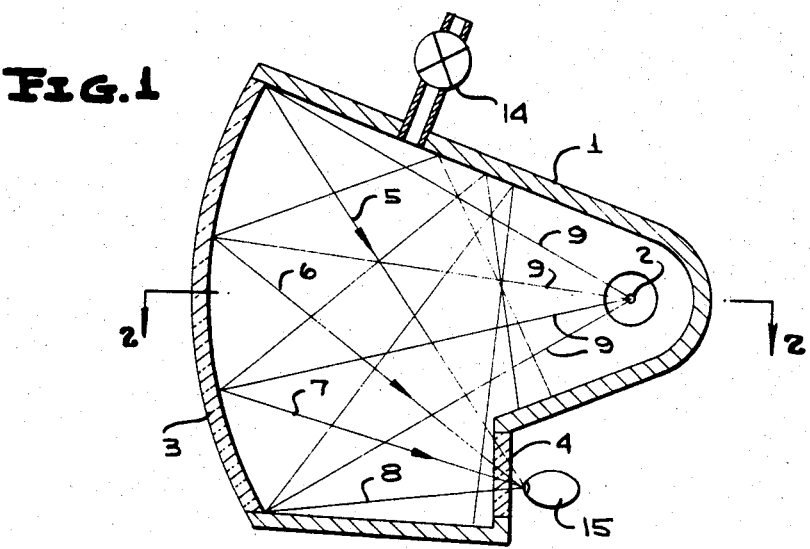
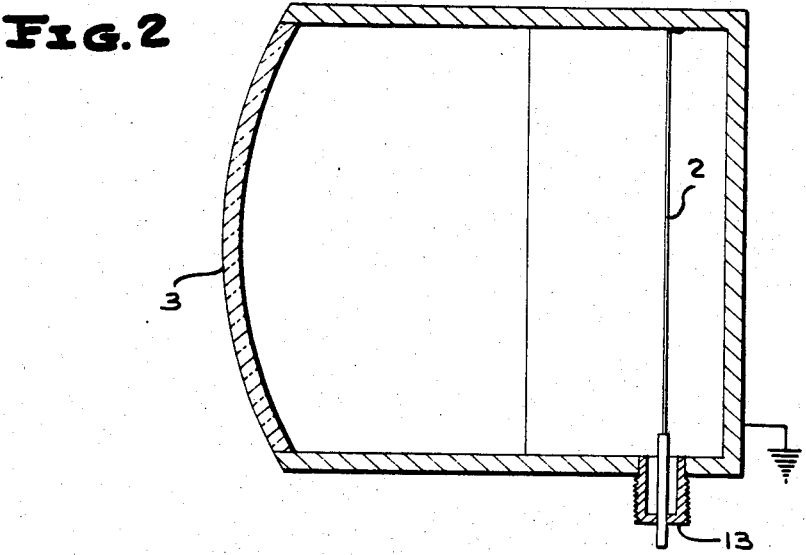

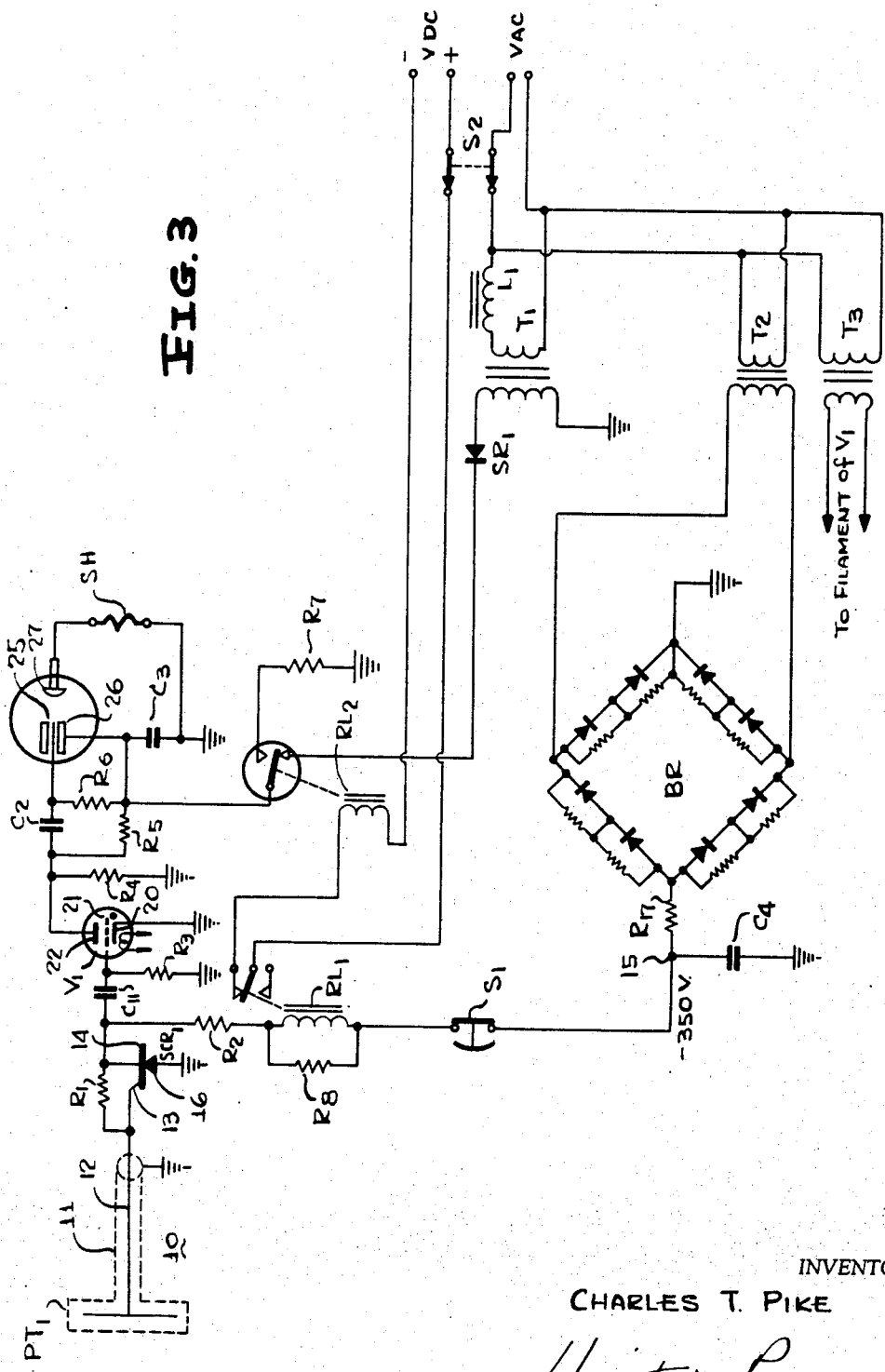

3,360,328
EXPLODING WIRE HIGH-SPEED SHUTTER FOR PROTECTING A HUMAN VIEWER
Charles T. Pike, Teaneck, N.J., assignor to Isomet Corporation, Palisades Park, N.J., a corporation of New Jersey
Filed Jan. 4, 1963, Ser. No. 249,510
3 Claims. (Cl. 350—269)

The present invention relates generally to light valves, and more particularly to light valves capable of extremely rapid transitions from transparent to relatively opaque conditions, in response to intense light flashes.

Explosions of atomic and hydrogen bombs are attended by extremely intense flashes of light. Military personnel as far away from the blast as 35 miles are subject to flash blindness or to retinal burn from such atomic flashes.

Flash blindness results from the bleaching of the retinal photosensitive chemicals by intense visible light. The duration of the incapacitation depends upon the brightness of the objects that must be seen after the flash has occurred. The problem is more serious at night than in the day, because at night the pupils will be larger and the visual task will be dimmer. The blink reflex is of little value in protection against flash blindness because of the tremendous intensity of the flash. At night, visual disability will exist for up to half an hour if the visual task is illuminated in a moonless sky. The reflectance of the background and of the atmosphere varies so much that distances at which flash blindness can occur will vary greatly.

Chorioretinal burns are produced by the image of the fireball on the retina. The visible and near infrared light are absorbed by the retinal and choroidal pigment. Such burns can be produced by a nominal bomb to distances of over 35 miles when the air is clear. Unless the fireball image is formed on the macular area the permanent effect will be a scotoma in the peripheral field, and will be in the same position in both eyes, thus giving a symmetrical binocular scotoma. If the image is produced on the macula bilaterally, this will result in a permanent central scotoma with vision reduced to 20/200 (peripheral acuity).

Considerable efforts have been made to develop a shutter or light valve which will provide protection against flash blindess and burns. The requirements for such a device are as follows:

(1) Response time of 50 microseconds or less.
(2) High transmission in the open position and very low transmission with the shutter closed.
(3) Large field of view.
(4) Low weight and bulk.
(5) Reasonable cost.

Electromechanical shutters have been developed which have a lower limit response time of the order of 500 microseconds. They are not fast enough.

Phototropic films appear to have some promise, but none have yet been developed that are faster than the electromechanical shutter.

A preferred embodiment of the present invention is an evacuated chamber with windows to provide an optical path through the chamber, in which one or both of the windows are coated with an opaque material in response to a strong flash of light. This may be accomplished by the explosive application of electric power to a wire or ribbon of conducting material in the chamber. Under these conditions, in the open position the user is able to see through the chamber with little loss in intensity in the device. When the windows are coated, however, the line of sight is cut off and the transmission of light to the eye is very slight.

It is accordingly a broad objective of the present invention to provide a rapidly operative light valve, which is normally transparent but which may be rendered relatively opaque in a time of the order of 50 microseconds or less.

Another object of the invention resides in the provision of circuitry for effecting an explosive deposition of metal onto a substrate in response to a flash of light.

It is a further object of the present invention to provide a window capable of a rapid transition from a transmitting to a reflecting condition.

The above and still further objects, features and advantages of the present invention will become apparent upon consideration of the following detailed description or one specific embodiment thereof, especially when taken in conjunction with the accompanying drawings, wherein:

FIGURE 1 is a view in section of the valve, arranged according to a preferred embodiment of the invention;
FIGURE 2 is a side view in section taken on line 2—2 of FIGURE 1; and
FIGURE 3 is a schematic circuit diagram of an electrical system for exploding the wire or ribbon of the valve of FIGURE 1.

Referring now more particularly to the accompanying drawings, the reference numeral 1 denotes a housing fabricated generally of opaque material, preferably electrically conducting, such as aluminum. The housing 1 has a vertical section in the shape of a rectangle closed at one end by a curved transparent window 3. In horizontal section the housing 1 has a roughly triangular shape with the window 3 closing the base of the triangle. A protrusion from one wall provides a mounting for window 4 parallel to the chord of window 3.

Light paths such as 5, 6, 7 and 8 then exist into the housing via window 3, and out of the housing 1 via window 4, to the eye 15 of an observer. The windows 3 and 4 may be fabricated of any conventional transparent material, such as glass or a transparent plastic, and are located such that upon the deposition of an opaque coating on them the light paths 5, 6, 7 and 8 are destroyed.

A conducting metallic ribbon or wire 2 stretches from top to bottom of the housing and is located at the center of curvature of window 3. Ribbon or wire 2 may be fabricated of any of a number of conducting metals which are vaporizable under low pressures and in relatively thin configurations upon application of suitably high currents thereto. Among the many suitable metals for such purpose are, for example, magnesium, aluminum, gold, platinum, palladium, copper, lead, silver, zinc, and indium. As will be apparent to those skilled in the art, metals having low vaporization points and low electrical resistance are better adapted to maintain sufficiently high peak currents to produce the desired vaporization. As an example, magnesium has a boiling point of 1110° C. and vaporizes rapidly when subjected to high energy inputs, attributes which have led to its conventional use in photographic flash powders and the like. A 0.006 inch thick by ⅛ inch wide magnesium foil will vaporize, or explode, under energy inputs on the order of 750 watt seconds. Other metals such as those mentioned above, react similarly in thin foil or wire configurations with thicknesses on the order of several thousandths of an inch. Such properties are well known and no claim is made to invention or discovery of these phenomena per se.

One end of wire or ribbon 2 is connected to electrical connection 13 which is hermetically sealed into the housing 1. The other end of wire or ribbon 2 terminates on the housing 1. The distance between the wire to be exploded or vaporized and the surface to be coated (i.e. the window) will, of course, depend upon the chamber pressure (vacuum pressure within housing 1) and the material of which the wire 2 is composed. It will be apparent that the chamber pressure must be low to minimize the conduction of the residual gas in the housing and to permit the metal particles resulting from vaporization of the wire to reach the window without undergoing a significant number of collisions with the gas atoms. In other words, the chamber pressure must be sufficiently low to permit the mean free path of the metal atoms to approach or to exceed the internal dimensions of the housing. Readily achievable and typical vacuum pressures of from $2 \times 10^{-4}$ to $5 \times 10^{-5}$ mm. Hg permit wire to window distances of several inches.

The housing 1 is evacuated through valve 14 which is closed to seal the unit.

In operation, then, eye 15 normally views a scene via the windows 3 and 4, along paths such as 5, 6, 7, and 8. On occurrence of an intense flash, such as accompanies an atomic explosion, a high current is applied to terminal 13 and returns to ground through housing 1, exploding or vaporizing wire or ribbon 2 and coating window 3 with material traveling along paths such as 9. Damage to the eye is thus prevented because the optical path has been destroyed.

The eye 15 is further protected from light released by wire or ribbon 2 by the configuration of housing 1 and window 3 making it impossible for light to be directly reflected from wire or ribbon to the eye 15.

Referring now to FIGURE 3, $PT_1$ is a photo-diode, assumed to be unilluminated, connected by means of a cable 10 to a silicon controlled rectifier $SCR_1$. The cable 10 includes an outer conductor 11 and an inner conductor 12, the former being grounded and the latter connecting to the trigger electrode 13 of the controlled rectifier $SCR_1$. The cathode 14 of the rectifier $SCR_1$ is connected via current limiting resistance $R_2$, relay coil $RL_1$, and normally closed switch $S_1$, to the negative terminal 15 of a power supply. The anode 16 of the controlled rectifier $SCR_1$ is grounded. The trigger electrode 13 is connected to the cathode 14 by means of a relatively large resistance $R_1$, which maintains the trigger electrode biased at a high negative potential. In this condition the rectifier is biased non-conductive.

An intense flash of light applied to photo-diode $PT_1$ brings the potential of lead 12 and hence of trigger electrode 13 near ground potential, which causes the diode $SCR_1$ to fire.

The negative potential on the cathode 14 appears also across capacitor $C_1$, one terminal $C_{11}$ of which is normally at ground potential. When diode $SCR_1$ fires the remaining terminal of this capacitor rises above ground potential, discharging through resistance $R_3$, and triggering thyratron $V_1$ into conductive condition.

Thyratron $V_1$ includes a grounded cathode 20, a control electrode 21 connected to the ungrounded terminal of resistance $R_3$, and an anode 22, connected normally to a source of positive DC voltage derived in the path resistance $R_5$, lower contact of switch $RL_2$, rectifier $SR_1$, transformer $T_1$, and AC terminals VAC. Resistance $R_4$ provides a voltage divider with resistance $R_5$, which determines the voltage at anode 22.

Capacitor $C_2$ and resistance $R_6$ are connected in series with each other across resistance $R_5$. Resistance $R_6$ is connected between control electrode 25 and cathode 26 of controllable spark gap $V_2$, having an anode 27. A capacitor $C_3$ is connected between anode 27 and cathode 26, via a load SH, which in the instant system represents the explodable rod or wire 2, of FIGURES 1 and 2. One side of capacitor $C_3$ is grounded, as is one side of load SH. This represents grounding of one end of rod 2 to the case 1, in FIGURES 1 and 2.

The total positive voltage provided by rectifier $SR_1$ appears across capacitor $C_3$. A portion thereof appears across capacitor $C_2$ and the remainder across resistance $R_4$, and hence across thyratron $V_1$.

When thyratron $V_1$ fires, one side of capacitor $C_2$ goes to near ground potential, and capacitor $C_2$ discharges, in a path including resistance $R_6$. Control electrode 25 thus goes highly positive, and the spark gap between control electrode 25 and anode 26 is fired. Thereby the path between anode 26 and cathode 27 is ionized, and the capacitor $C_3$ discharges through the load SH. The capacitor $C_3$ has sufficient capacity, and its voltage is sufficiently high, that if load SH is an explodable or vaporizable rod or wire, the latter will explode or vaporize, in response to the instantaneously applied high power.

When diode $SCR_1$ is triggered, and becomes conductive, current flows through relay coil $RL_1$ pulling down its armature. This action breaks the circuit of relay coil $RL_2$, releasing its armature upward, thus breaking the charging circuit for capacitors $C_2$, $C_3$, and removing anode voltage from thyratron $V_1$. The upper contact of relay $RL_2$ completes a circuit to ground for the normally ungrounded side of capacitor $C_3$, through resistance $R_7$, and assures its complete discharge.

The load SH, i.e. rod 2, may then be replaced without danger. Once the rod 2 has been replaced, switch $S_1$ can be opened, deenergizing relay coil $RL_1$ and reenergizing relay coil $RL_2$, and removing potential from cathode 14. Upon reclosing switch $S_1$ the system is recycled. The coated window 3 must, of course, be replaced before the light valve is again ready for use.

The terminal 15 may be supplied with voltage via a full wave bridge rectifier BR, associated with a filter condenser $C_4$, and is per se conventional.

The relays $RL_1$, $RL_2$ may be supplied with operating power from an auxiliary 24 VDC supply. The bridge rectifier BR may be supplied with AC power from 115 v., 400 c.p.s. terminals VAC, via transformer $T_2$, and transformer $T_3$ is a filament supply for thyratron $V_1$. Terminals VAC also supply transformer $T_1$, which supplies rectifier $SR_1$, and thus constitutes the high voltage power supply for the system.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A light valve adapted to undergo rapid transition from an open condition, wherein a light transmission path is provided therethrough, to a closed condition, wherein said light transmission path is interrupted, in response to an intense light flash along the light transmission path externally of said valve; said valve comprising:

an opaque housing having a pair of at least partially open ends disposed in light transmitting relationship to each other;

first and second transparent windows positioned respectively in said pair of open ends to provide a light transmission path through said housing;

a conductive wire composed of material which vaporizes upon application of high current thereto, and disposed within said housing relative to at least one of said first and second windows such that said material is deposited on said at least one of said windows in the form of an opaque coating upon vaporization of said material which serves to stop the light transmission and so disposed relative to the other of said first and second windows that said opaque housing prevents light transmission from said wire to said other of said first and second windows;

means hermetically sealing said housing;

means for evacuating said housing; and means responsive to said intense light flash for substantially instantaneously applying said high current to said wire, said means for applying including an electrical power supply, an electric circuit coupling said power supply to said wire in normally open circuit relationship, and photoelectric means to energize said electric circuit in response to said intense light flash so that current derived from said power supply is substantially instantaneously applied to said wire.

2. The combination according to claim 1 wherein said electric circuit further includes
   means for storing electrical energy derived from said power supply, and
   switch means responsive to the operation of said photoelectric means upon exposure thereof to said intense flash of light for substantially instantaneously coupling said storing means to said wire to dissipate the stored electrical energy through said wire.

3. The combination according to claim 1 wherein said electric circuit includes a capacitor capable of storing high voltages, normally open switching means disposed in series circuit with said capacitor, said series circuit connected across said conductive wire, and further means responsive to the electrical condition of said photoelectric device upon incidence of said intense light flash thereon for closing said switching means to discharge said capacitor through said conductive wire.

References Cited

UNITED STATES PATENTS

| | | | |
|---|---|---|---|
| 2,403,730 | 7/1946 | MacNeille | 88—1 |
| 2,432,084 | 12/1947 | Blair | 250—214 |
| 2,470,139 | 5/1949 | Campbell | 95—53 |
| 2,737,598 | 3/1956 | Lewis et al. | 250—214 |
| 2,926,293 | 2/1960 | Camm et al. | 88—1 |
| 3,008,374 | 11/1961 | Kreisman | 88—61 |
| 3,152,215 | 10/1964 | Barstow et al. | 88—1 |

OTHER REFERENCES

Edgerton et al.: "Rapid-Closing Electronically-Operated Shutter," Review of Scientific Instruments, vol. 27, No. 3, March 1956, p. 162.

Muirhead et al.: "Rapid-Opening Electronically-Operated Shutter," Review of Scientific Instruments, vol. 32, No. 10, October 1961, pp. 1148 and 1149.

JEWELL H. PEDERSEN, *Primary Examiner.*

RONALD L. WIBERT, *Examiner.*

J. L. CHASKIN, E. S. BAUER, *Assistant Examiners.*